(12) United States Patent
Opincariu et al.

(10) Patent No.: US 11,720,548 B1
(45) Date of Patent: Aug. 8, 2023

(54) SHADOW DATA LAKES (71) Applicant: Amazon Technologies, Inc., Seattle, WA (US)

(72) Inventors: Daniel Opincariu, Redmond, WA (US); Yangbae Park, Seattle, WA (US); Sanjay Mathew Thomas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/205,949

(22) Filed: Mar. 18, 2021

(51) Int. Cl.
*G06F 16/23* (2019.01)
*G06F 16/245* (2019.01)
*G06F 21/62* (2013.01)

(52) U.S. Cl.
CPC ........ *G06F 16/2379* (2019.01); *G06F 16/245* (2019.01); *G06F 21/6245* (2013.01)

(58) Field of Classification Search
CPC ................. G06F 16/24; G06F 16/2448; G06F 16/24534; G06F 16/24565; G06F 16/2358; G06F 16/2379; G06F 16/245; G06F 16/27; G06F 21/6218; G06F 21/6227; G06F 21/6245
See application file for complete search history.

(56) References Cited

U.S. PATENT DOCUMENTS

| | | | |
|---|---|---|---|
| 9,298,726 B1 | 3/2016 | Mondal et al. | |
| 10,606,766 B1* | 3/2020 | Rellinger | G06F 21/60 |
| 11,176,140 B2 | 11/2021 | Martin et al. | |
| 2005/0144176 A1* | 6/2005 | Lei | G06F 16/24553 |
| 2006/0070019 A1* | 3/2006 | Vishnumurty | G06F 16/21 |
| | | | 717/101 |
| 2007/0112456 A1* | 5/2007 | Sanka | G05B 19/41875 |
| | | | 702/81 |
| 2009/0300002 A1* | 12/2009 | Thomas | G06F 16/2457 |
| | | | 707/999.005 |
| 2010/0223701 P1 | 9/2010 | Harris, III et al. | |
| 2010/0312749 A1 | 12/2010 | Brahmadesam et al. | |
| 2017/0070492 A1 | 3/2017 | Rubin et al. | |
| 2018/0004786 A1 | 1/2018 | Danilov et al. | |
| 2018/0210959 A1 | 7/2018 | Khandelwal | |
| 2018/0329940 A1* | 11/2018 | Tiku | G06F 9/546 |
| 2020/0117824 A1* | 4/2020 | Upadhyay | G06F 16/258 |

OTHER PUBLICATIONS

Q. Dang "Recommendation for Applications Using Approved Hash Algorithms" Computer Security, Aug. 2012; DOC-NIST, 25 pages.

(Continued)

*Primary Examiner* — James E Richardson
(74) *Attorney, Agent, or Firm* — Eversheds Sutherland (US) LLP (57) ABSTRACT

Systems, devices, and methods are provided for implementing shadow data lakes. In at least one embodiment, a deletion workflow obtains a deletion request from a delete request cache service, gets attestation details from an attestation service, submits a job to scan one or more records from a source table of a data lake and publish the one or more records to a deleted records table of a shadow data lake, and cause deletion of the one or more records from the data lake.

19 Claims, 6 Drawing Sheets

(56) References Cited

OTHER PUBLICATIONS

Arindam Bhattacharya, Srikanta Bedathur, and Amitabha Bagchi. 2020. Adaptive Learned Bloom Filters under Incremental Workloads. In Proceedings of the 7th ACM IKDD CoDS and 25th COMAD (CoDS COMAD 2020). Association for Computing Machinery, New York, NY, USA, 107-115. (Year: 2020).

"S. Tarkoma, C. E. Rothenberg and E. Lagerspetz, ""Theory and Practice of Bloom Filters for Distributed Systems,"" in IEEECommunications Surveys & Tutorials, vol. 14, No. 1, pp. 131-155, First Quarter 2012, doi: 10.1109/SURV.2011.031611.00024. (Year: 2012)".

"D. Gupta and S. Batra, ""A short survey on bloom filter and its variants,"" 2017 International Conference on Computing,Communication and Automation (ICCCA), 2017, pp. 1086-1092, doi: 10.1109/CCAA.2017.8229957. (Year:2017)".

\* cited by examiner

SHADOW DATA LAKES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, such distributed systems may provide database systems to clients. As the scale and scope of database systems have increased, the tasks of provisioning, administering, and managing system resources have become increasingly complicated. For example, the costs to search, analyze, and otherwise manage data sets can increase with the size and scale of the data sets. In such environments, ensuring compliance with regulatory requirements may be challenging.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Techniques described herein may be utilized to implement shadow copies of distributed data within large-scale distributed storage systems and environments. In the past, organizations have traditionally utilized data warehouses for large-scale data storage. However, because of the increasing volume of data, many organizations have discovered that data warehouse solutions do not meet their needs because it is not feasible to utilize data warehouses with the ever increase volume of data. In contrast, for a data lake, data may be stored across many different locations or providers, and a data lake catalog is created and maintained to facilitate access to data of the data lake. For example, the catalog may include credentials and other information such as schema so that regardless of where the data is stored, data consumers have a single view to search and use the data. These data lakes have a different ownership model from data warehouses. In data lakes, the data may be stored anywhere and control of data can be distributed across multiple entities. Rather than storing all data of a data warehouse, a data lake service provider may own and store only the data lake catalog and metadata associated with the data lake rather than the entire contents of the data lake.

Data lakes may utilize a schema-on-read architecture where data is stored in its original or raw format and a schema or structure to the data is applied when the data is read. Data lakes may include a mix of relational and non-relational data that are stored side by side, as no structure is imposed on data producers when they save data objects or items to the data lake. However, the data lake service provider may lack context as to data changes, such as whether a large-scale data change was applied correctly, which may be due at least in part to the lack of a defined schema or structure when data is ingested. As an example, data can be subject to current and evolving data privacy standards or regulations. These regulatory requirements can require certain data—such as consumer data or privacy data—to be deleted upon request. Data producers may store data items in the data lake in its raw or native format, which may make it difficult to determine whether the data being stored would be subject to an applicable data privacy standard or regulation, such as whether the data item or a portion thereof includes privacy data that should be deleted in response to a request by an individual for the erasure of all personal data related to the individual.

In the process of complying with various requirements, such as a deletion request to comply with an applicable data privacy standard or regulation, large amounts of data may be deleted, and there may be a need to determine whether these delete workflows are operating properly. In some cases, audit and/or recovery workflow may be implemented to review and verify that the deletion workflow is operating properly, that the correct data is being deleted, to perform various types of audits (e.g., which may be to comply with other requirements), and so on. In some cases, data may be subject to deletion under a first regulatory requirement but simultaneously subject to a retention requirement under a second regulatory requirement. As described in greater detail below, techniques described herein can be utilized to implement shadow data lakes to facilitate compliance with various regulatory requirements. A shadow data lake may be utilized to track any changes that occur in a data lake and provide the ability to review the change history of a data lake. For example, this history can be used for auditing purposes, investigation purposes, recovery purposes, and various other purposes based on the context in which it is being used. These uses are non-limiting examples and can be expanded on. Unlike in data warehouse environments where data where ownership of the stored data is centralized, data lake environments have a different ownership model in which data controllers and data processors are different entities. For example, a first service provider may be responsible for cataloging data that is stored by a second service provider. In a data lake environment, storage of the underlying raw data of a data lake may be controlled by one organization or computing entity and another organization or computing entity may control or otherwise manage storage of shadow data lake contents. A shadow data lake may store data in a manner similar to a customer-facing data lake, but may be used for a different purpose. A shadow data lake may be used for internal purposes such as audit histories. A shadow data lake may be hidden from data set owners and not exposed to typical data consumers. In some cases, the shadow data lake can only be accessed for specific authorized purposes such as a legal or compliance purpose, or a recovery purpose. For example, shadow data lakes can be utilized by auditors to verify compliance with various requirements, or can be used by a system administrator or recovery specialist to investigate potential instances of data corruption or other data quality issues.

A shadow data lake can be used to keep track of changes in the customer-facing data lake. For instance, if there is a delete event, then a data object may be deleted from the customer-facing data lake as part of processing the delete event. As part of the delete event, a copy of the deleted data may be retained in the shadow data lake, and then archived, even though the data is represented as having been deleted to users of the customer-facing data lake. In various implementations, shadow data lakes have permissions separate from those of the original data lake and access to the shadow data lake may be restricted to only a set of specific purposes, such as auditing purposes, investigation purposes, or recovery purposes. As an example, a user that deletes a record of a customer-facing data lake typically will not have access to a corresponding shadow record that is created in the shadow data lake as part of a deletion workflow that is executed to delete the contents of the record.

Shadow data lake can be implemented in the context of various use cases. As a first example, shadow data lake can be implemented for compliance purposes where a user or other entity provides instructions to delete data of a data lake that is subject to retention requirements. As a second example, shadow data lake can be implemented for auditing or investigation purposes where an auditor reviews the destruction (e.g., deletion) of records by a user under audit or investigation. As a third example, shadow data lake can be implemented for backup purposes where a data set is subject to a large-scale change which may or may not be implemented correctly, and the backup can be used to determine whether the large-scale change was applied correctly and/or take remedial action if errors in applying the large-scale change are detected.

In data lakes, computing entities may operate under one or more different capacities, which may include acting as a data producer, data consumer, and/or data aggregator. A data producer may create, update, and delete data sets; data producers may perform extract, transform, and load (ETL) procedures on data lake data sets. A data consumer may use data lake data sets for analysis. Data consumers may search, sort, and identify data sets for analysis, explore schemas, crawl data sets, extract metadata, and various other functionalities.

In various embodiments, data exists across a data lake in multiple formats. For example, raw data provided by data producers may be stored in an unstructured or native format, and this data may be transformed to create a copy of the data that conforms to a standardized format. For example, data from a text file may be extracted, loaded, and transformed to be in a database according to a schema. The contents of the text file may be analyzed to identify different portions of the text file that correspond to the database schema.

A shadow data lake can be used to ensure compliance with data retention requirements, even in cases where data is mislabeled. For example, if a data producer fails to properly tag source data as being subject to a retention policy and the source data is subsequently deleted, a copy of the data retained in the shadow data lake can be used for recovery when it is subsequently discovered that the source data should not have been deleted due to an applicable retention policy.

In at least one embodiment, a customer refers to a computing client of a computing resource service provider. A client may also be an internal customer of the computing resource service provider. Customers may submit requests to a data lake service provider that requests the deletion of privacy data. The request may specify privacy data that is subject to deletion, for example, under a deletion request under an applicable data privacy standard or regulation. The request may be spread out throughout various services of a computing resource service provider, which manages a central data catalog of the contents of the data lake and information as to where the data may be stored. In some cases, source data is replicated across multiple services which may be utilized for efficient searching, filtering, analysis, etc. of the underlying contents of the raw data. As an illustrative example, a deletion request under an applicable data privacy standard or regulation can be executed as a step functions workflow where a data set of analyzed to identify or otherwise determine which data sets are compliant with an applicable data privacy standard or regulation and to delete certain privacy data. As part of the deletion workflow, a system identifies what types of records are to be deleted and a search is conducted against the original data set to identify various data objects, items, or records that are subject to the deletion request. Upon identifying one or more data objects that are subject to the delete request, a system may copy, replicate, or otherwise store such data objects in a shadow data vault. Once the data objects have been preserved in the shadow data lake, then the steps to actually delete the target records may be performed by, for example, marking the object for deletion, propagating the delete to other services or service providers, and then purge those records in the data vault and customer-facing data lake.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

Figure 1:
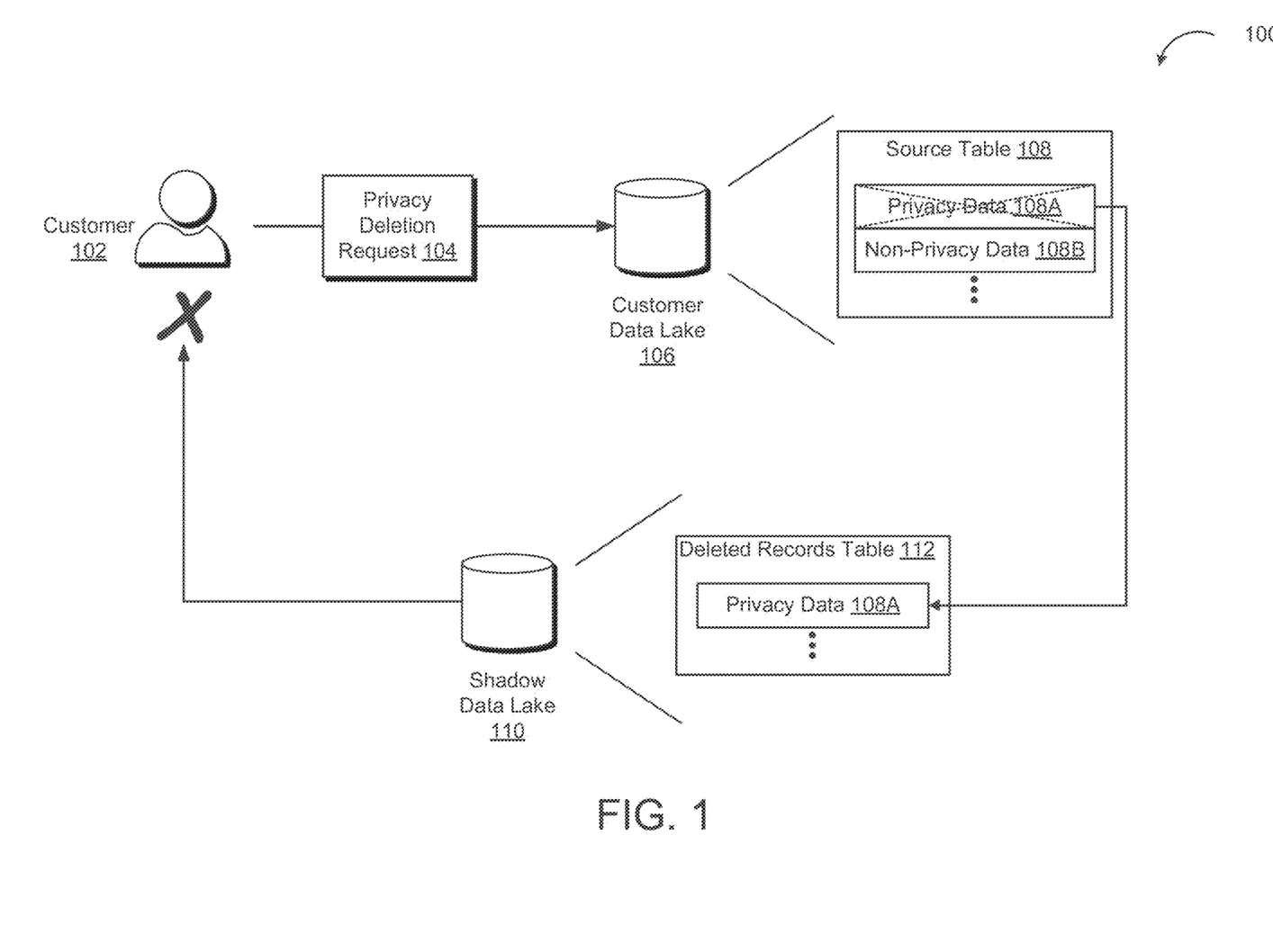
FIG. 1 illustrates an example of a computing environment in which shadow data lakes can be implemented, in accordance with one or more example embodiments of the present disclosure.

FIG. 1 illustrates an example of a computing environment 100 in which shadow data lakes are implemented, according to at least one embodiment.

Customer 102 may refer to a client computing entity that interacts with other computing entities such as a data lake service provider. In various embodiments, customer 102 connects with a service provider over a network to establish a client-server relationship. For example, a cryptographically protected communications session according to a Transport Layer Security (TLS) protocol can be used to establish secure communications between the customer 102 and various other computing entities. Customer 102 may refer to a computing entity that operates within computing environment 100 and interacts with a customer-facing data lake via web service application programming interface (API) commands or requests. Customer 102 can submit various types of requests to interact with customer data lake 106 such as requests to read (e.g., consume) or write (e.g., produce) data. For example, customer 102 may submit a privacy deletion request 104 to request the deletion of certain privacy data. Privacy deletion request 104 may be submitted over a network (e.g., as a web API command) and include parameters that specify what type of privacy data is to be deleted. For example, an identifier such as a customer ID may be encoded in the request, which can be used to identify which data objects within customer data lake 106 the delete request is directed towards.

In at least one embodiment, privacy deletion request 104 is a request that is submitted to customer data lake 106 under current and evolving data privacy standards or regulations that govern data privacy. Under an applicable data privacy standard or regulation, a data subject may have the right to demand the erasure of personal data relating to said data subject. For example, individuals may demand the erasure of personal data stored within customer data lake 106. Individuals may submit deletion requests under a data privacy standard or regulation and the individuals' requests may be used to generate deletion requests such as privacy deletion request 104 illustrated in FIG. 1.

Customer data lake 106 may include a plurality of object stores that are stored in a distributed manner. Object stores may differ in their performance characteristics, application programming interfaces (APIs), storage architectures, and/or other attributes. Objects in one object store in the data lake 106 may represent a different structure and/or different data types than objects in another object store. Objects in the data lake 106 may include object blobs or files. Objects in the data lake 106 may include semi-structured data (e.g., CSV files, logs, XML files, JSON files, and so on). Objects in the data lake 106 may include unstructured data (e.g., e-mails, word processing documents, PDFs, and so on). Objects in the data lake 106 may include binary data (e.g., images, audio, and video). In some embodiments, data lake 106 includes objects that are not stored as structured data in tables that organize data by rows and columns. In some embodiments, at least some of the records in the data lake 106 are stored without using a schema. A schema may represent a formal definition of the structure or organization of a data store. In some embodiments, at least some of the records are stored in the data lake 106 according to a partial schema. A partial schema may partially but not completely define the structure or organization of a data store. In some embodiments, some of the records may be stored in one object store according to a partial schema that differs from others of the records in another object store.

At least some of the data lake 106 may be archived, infrequently updated, and/or read-only under normal use, at least after a period of time. For example, an entity that enables Internet-based sales from an electronic catalog of goods and services may maintain one or more data sets to store data for customer orders. Older order information may be archived, e.g., in a data set that is partitioned by order date such that no additional data is added to a partition after sufficient time has passed since the corresponding date of the partition.

In various embodiments, privacy deletion request 104 encodes parameters that can be used to query and locate records of the data lake data set which are to be deleted. For example, source table 108 of customer data lake 106 may comprise several records including privacy data 108A, non-privacy data 108B, and so on. Privacy deletion request 104 may encode parameters which are used to evaluate whether records within customer data lake 106 are to be deleted. For example, privacy data 108A may be a first record of source table 108 that is evaluated in a deletion workflow. Records of source table 108 may be evaluated to determine whether they include privacy data. Privacy deletion request 104 may include parameters that indicate what fields or data to search for within a record, such as a specific customer ID, a name, or other information that identifies an individual. For illustrative purposes, FIG. 1 depicts a source table 108 with privacy data 108A that is subject to the deletion request and non-privacy data 108B which is not subject to the deletion request.

As part of a deletion workflow, a system may scan customer data lake 106 for data objects of the data lake that are subject to the deletion request, determine whether the data objects are subject to a retention policy, and based on a data object being subject to the retention policy, store a copy of the data being deleted in shadow data lake 110. Shadow data lake 110 may be a data lake that is hosted separately from customer data lake 106 and is hidden from customer 102, in at least one embodiment. Shadow data lake may retain the contents of data that is deleted or otherwise removed (e.g., data field values that are overwritten) and can be used for auditing purposes, investigation purposes, recovery purposes, and various other purposes based on the context in which it is being used. In customer data lake environment, the ownership model may allow for different data of the data lake to be stored and controlled by different computing entities. For example, raw data of a data lake may be stored by an organization using on-premises data storage solutions and connected to a data lake service provider via a network (e.g., Internet). Metadata relating to the contents of the data lake and how to access them (e.g., credential information) may be stored by the data lake service provider, where control and ownership of the raw data may be with the organization for any data stored on-premises. Furthermore, transformed copies of the raw data may reside on the data lake service provider, meaning that the deletion of privacy data may involve deletions of both a version of the data (e.g., raw format) from an on-premises data store as well a transformed version that resides in the data lake service provider.

As part of a deletion workflow, an attestation service (not shown in FIG. 1) may be utilized to determine whether or not to record a copy of the data being deleted from customer data lake 106 in shadow data lake 110. In various embodiments, a data producer can define attestations that attest that data sets produced by them include privacy data or that the data does not include any privacy data. Attestations can be used to tag or otherwise identify whether data created by the producer includes privacy information or other information that may be subject to retention requirements. An attestation may be used to determine how to evaluate whether data is privacy data, should be retained for auditing reasons, and more. For example, an attestation can be used to identify financial records that should be retained for internal auditing purposes. Data producers or any other suitable entity can generate attestations at any point prior to the execution of the deletion workflow, such as when the data is added to a data lake. However, in at least one embodiment, it is not a requirement to define attestations when the data producer creates the data, and attestations can be defined or updated subsequent to the creation of data in the data lake. In some embodiments, a data producer creates data that is stored in the data lake and the data is analyzed and cataloged later by another computing entity, such as a metadata service of a data lake service provider.

Shadow data lake 110 may be a data lake service provider that is hosted separately from customer-facing data lake 106. In various embodiments, a delete workflow publishes data records that will be deleted as part of a deletion workflow because the data is subject to a retention policy. An attestation service may be utilized by deletion workflow to determine whether a data record should be published to shadow data lake 110, which may comprise a set of tables such as deleted records table 112. As an example, when data such as privacy data 108A is subject to deletion from customer data lake 106, the deletion workflow may include logic to check whether privacy data 108A is subject to a retention policy, which may be for auditing purposes, investigation purposes, recovery purposes, and various other purposes. The deletion workflow may retrieve attestation details from an attestation service to make a determination as to whether to publish the data being deleted to shadow data lake 110. The determination may be made, for example, by determining whether the data being deleted is privacy data or non-privacy data. In various embodiments, privacy data 108A is published to shadow data lake 110 and then subsequently deleted from customer data lake 106.

In some embodiments, a portion of a record—rather than an entire record, may be published to shadow data lake 110. For example, in some embodiments, retention policies may require only the specific fields, columns, or attributes of a record that store privacy data to be retained in the shadow data lake 110. In some embodiments, the attestation details define a schema indicating which portions of a record will be stored in the shadow data lake 110. Accordingly, in some cases, only specific fields of a record (e.g., as defined by attestation details) are published to a corresponding shadow data lake record.

In some embodiments, additional metadata is stored in association with a record or portion thereof—for example, metadata stored in association with a record or portion thereof may indicate what operation was performed. For example, shadow data lake may store metadata that indicates whether a record was deleted or if certain fields of a record were updated. Values of fields of a record that are overwritten by other values may be stored in shadow data lake so that modifying or updating individual field, column, or attribute values are recorded in shadow data lake in a manner that can be audited and/or restored.

As illustrated in FIG. 1, customer 102 is not able to access shadow data lake 110, according to at least one embodiment. Permissions and rights to access the contents of deleted records in shadow data lake 110 may be different from the permissions to access customer data lake 106. Accordingly, customer 102 may have sufficient rights to delete privacy data from customer data lake 106 but not determine whether the privacy data was published to shadow data lake 110. The customer's view of the customer-facing data lake indicates that privacy data 108A was deleted and that the privacy deletion request 104 was fulfilled. For customers such as customer 102 illustrated in FIG. 1, they do not have sufficient permissions to access shadow data lake 110 and queries to customer data lake 106 after the deletion request was processed will not return privacy data 108A as such data was deleted from customer data lake 106, according to at least one embodiment. The state of customer data lake 106 and/or view on to customer data lake 106 by customer 102 may be in compliance with various current and evolving data privacy standards or regulations.

Shadow data lake 110 may be accessible to administrators, legal, auditing, or other specific users and/or departments of shadow data lake provider. The permissions to access the shadow data lake 110 may be limited for auditing purposes, investigation purposes, recovery purposes, and various other purposes. For example, shadow data lake 110. For example, data such as privacy data 108A may simultaneously be subject to an erasure request under an applicable data privacy standard or regulation as well as subject to a retention requirement under an organization's auditing policies. To comply with the auditing requirements, privacy data 108A is published to shadow data lake 110 and to comply with the applicable data privacy standard or regulation, privacy data 108A is deleted from the customer-facing data lake, according to at least one embodiment.

Figure 2:
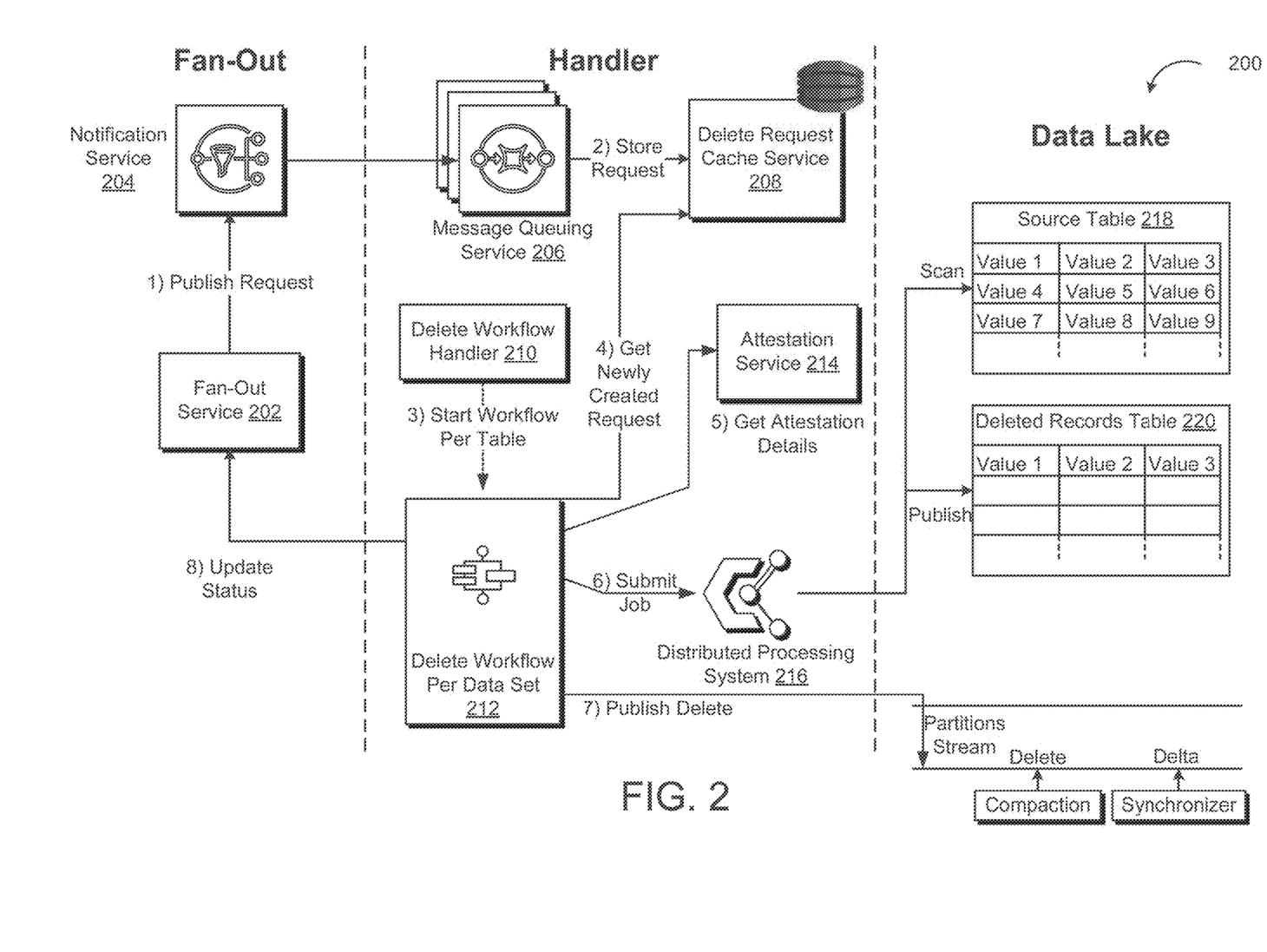
FIG. 2 illustrates an example of a computing environment of a deletion workflow, in accordance with one or more example embodiments of the present disclosure.

FIG. 2 illustrates an example of a computing environment 200 of a deletion workflow, in accordance with one or more example embodiments of the present disclosure.

Fan-out service 202 may refer to a front-end service or other suitable computer systems that collects from external customers and fans out those request to a set of data storage entities. In a data lake, data sets may be stored across various distributed systems, including on-premises servers, remote servers, distributed storage systems and more. Fan-out service 202 may coordinate the delivery of deletion requests to various data stores and service providers where data lake data sets may reside. In various embodiments, fan-out service 202 publishes a deletion request which is received by notification service 204.

Notification service 204 may be a service of a computing resource service provider that hosts the shadow data lake. Notification service 204 may provide message delivery capabilities using a publisher and subscriber (pub/sub) model. Publishers may communicate asynchronously with subscribers by sending messages to a topic, and clients can subscribe to a topic and receive published messages using a protocol such as message queuing service 206. Message queuing service 206 may refer to a message queueing service to decouple and scale serverless application. Message queuing service 206 may be utilized to manage and operate message-oriented middleware. In various embodiments, message queueing service decouples distributed systems and components and provides a generic interface which can be used to store request information, trigger the execution of workflows, and more.

In various embodiments, message queuing service 206 stores delete request data in a delete request cache service 208. Delete requests may be aggregated in the delete request cache service so that multiple delete requests are batched and processed together, rather than individually. Delete requests may be aggregated to reduce the number of discrete write events in the data vaults where the raw data of the data lake are stored.

Delete request cache service 208 may be implemented using any suitable data storage software and/or hardware. In at least one embodiment, a key-value store or database is used to store delete requests, which can be aggregated over a period of time and released to be processed on a periodic schedule, based on a threshold number of requests being aggregated together, in response to a signal to process deletions, and so on.

Delete workflow handler 210 may refer to a handler within the service provider that orchestrates the deletion workflow. The deletion workflow handler 210 may start workflow per table and a delete step functions workflow 212 per data set. Each step functions workflow may obtain request information by retrieving newly created requests from delete request cache service 208 and perform a process for handling the delete requests. Processes supported by the delete workflow may be in accordance with those described elsewhere in this disclosure, such as those discussed in connection with FIG. 5.

Attestation service 214 may include logic that is used to determine how to characterize data of the data sets. In various embodiments, attestation service 214 includes logic that can be used to determine how to identify privacy data, audit data, and so on. In various embodiments, attestation service 214 can be utilized to determine whether a data record being deleted is subject to any retention policies, thereby indicating that data should be copied to a shadow data vault prior to deletion. In some embodiments, attestation service 214 identifies that data should be copied to the shadow data lake based on the contents of the data. In some embodiments, attestation service 214 identifies that data should be copied to the shadow data lake based on an operation being performed—for example, a data producer that is bulk-updating a data set may indicate that data being deleted should be backed up. This backup may be used to serve various purposes—as a first example, the shadow data lake backup can be used in cases where a data scientist or engineer is applying a bulk update but is unsure of whether the change was correctly encoded. The backup can serve as a way to recover data that was erroneously deleted, to review whether the bulk-update (e.g., bulk deletion) executed as expected, and so on. A system executing a delete workflow for a data set may get attestation details from attestation service 214 which can then be used to determine whether any or all data records being deleted are to be replicated in a shadow data vault prior to deletion. A delete workflow may obtain attestation information from attestation service 214 by submitting a request to attestation service 214 for one or more attestation details and receive a response from attestation service 214 with the requested information. Delete workflow obtains attestation information in any suitable manner, such as by submitting web service API requests to an attestation service and receive a response with the attestation information, by directly accessing attestation information stored at a network location, or using various other suitable techniques.

Delete workflow 212 may submit a job to a distributed processing system 216. Distributed processing system 216 may be a platform for processing large quantities of data using distributed processing software such as Apache Spark, Apache Hive, Apache HBase, Apache Flink, Apache Hudi, Presto, and so on. Distributed processing system 216 may programmatically perform tasks such as provisioning capacity and tuning clusters. Distributed processing system 216 may be in accordance with those described elsewhere in this disclosure, such as those discussed in connection with FIG. 6. Distributed processing system 216 may be a managed cluster platform that utilizes parallel programming techniques to analyze large amounts of data in a data lake in a parallelized manner. Distributed processing system 216 may use a cluster of compute resources to process a deletion job by scanning multiple portions of a data set in parallel. A plurality of compute instances may each be assigned a different non-overlapping portion of a data set to scan. The scan may involve determining whether a record in source table 218 is subject to the deletion request based on attestation details retrieved from attestation service 214. If a record or field thereof is being deleted and is subject to a retention policy, then the record may be published in deleted records table 220. For example, FIG. 2 illustrates source table 218 with several records wherein the first record with "Value 1", "Value 2", and "Value 3" is being deleted but is also subject to a retention policy. Continuing with the example, prior to deleting the first record, a copy of the first record is published to deleted records table 220 which may be a part of the shadow data lake. In various embodiments, the deletion of a record from a source data set and the replicating of such data to a shadow data vault is performed in an all-or-nothing manner. For example, database transaction techniques may be utilized such that both operations are either committed together or rolled back together, thereby ensuring the integrity of the overall system.

Deleted records table 220 may be a corresponding data set that is stored by a shadow data lake service provider which may be different from the service provider that stores source data table 218. In some embodiments, deleted records table 220 retains data at a per-record level. In some embodiments, shadow data lakes retain data at a per-field level, which may be represented as tuples of data comprising a unique identifier (e.g., record identifier), the field, and the value that was deleted. In some embodiments, deletion of the source data is performed after scanning the source table by invoking business data type (BDT) compaction and synchronizer so that the deletion is propagated down to the source table and to downstream services. In various embodiments, compaction refer to the joining of small files into a bigger file and may be an optimization or maintenance technique to ensure fast read access to data. Synchronizers such as the synchronizer illustrated in FIG. 2 may be utilized to create copies of data sets residing in the data lake on users' data stores or data customers. Synchronizers can be used to enforce access controls by integrating with internal access controls and authentication systems. In various embodiments, the synchronizer is used to synchronize data changes with user clusters and update metadata changes as part of the deletion of data.

Figure 3:
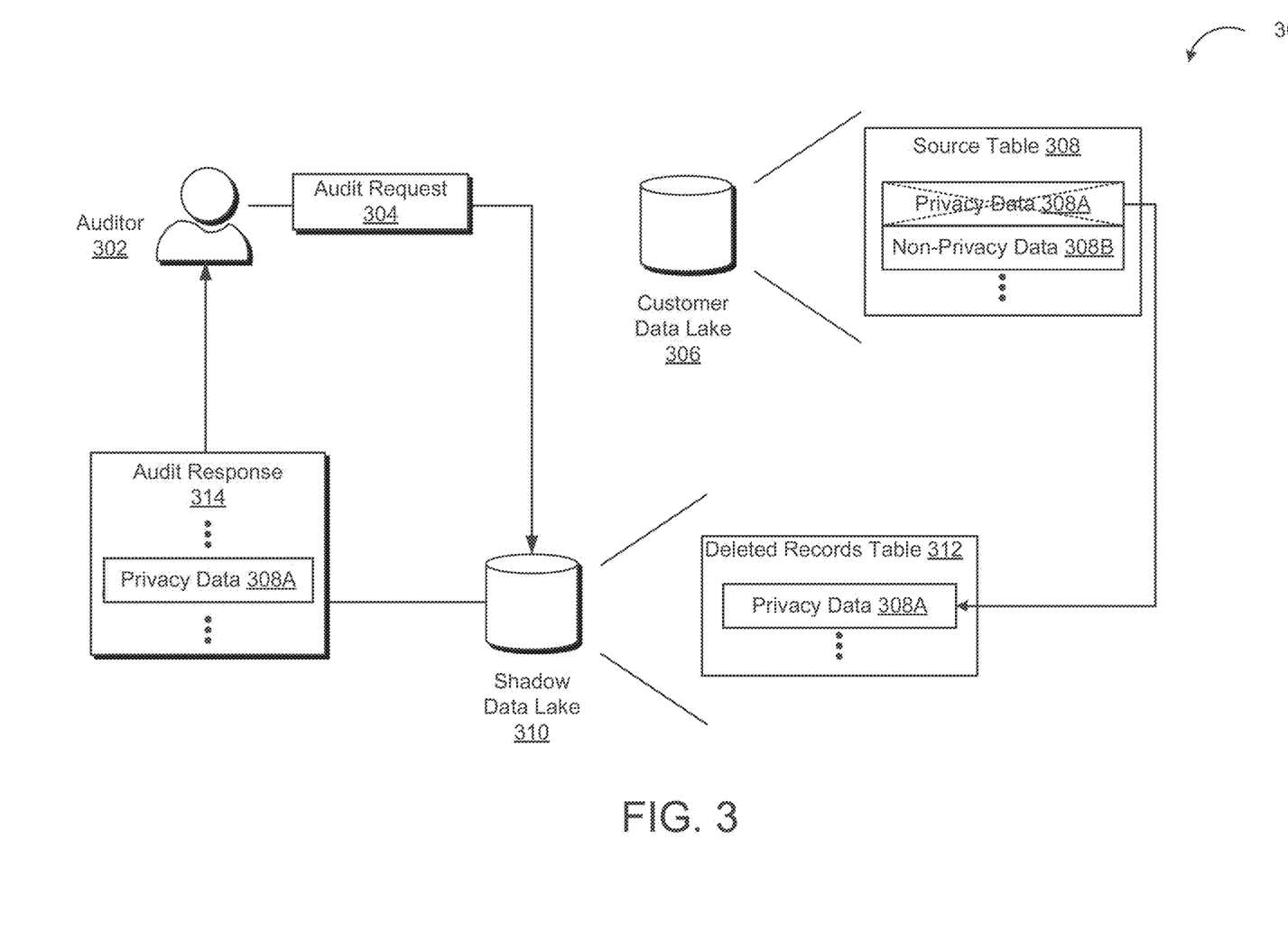
FIG. 3 illustrates an example of a computing environment of an auditing workflow, in accordance with one or more example embodiments of the present disclosure.

FIG. 3 illustrates an example of a computing environment 300 of an auditing workflow, in accordance with one or more example embodiments of the present disclosure. As illustrated in FIG. 3, an auditor 302 may submit an audit request 304. Customer data lake 306 may refer to a customer-facing data lake comprising source table 308. Privacy data 308A may have been deleted from source table 308, for example, as described above in connection with FIG. 1. Privacy data 308A may have been previously published to shadow data lake 310 as part of a deletion workflow. Shadow data lake 310 may comprise a deleted records table 312 where privacy data 308A is retained, even after deletion of the privacy data 308A from customer data lake 306. Audit response 314 may be a response to audit request 304. Components discussed in connection with FIG. 3 may be in accordance with corresponding components described elsewhere in this disclosure, such as those discussed in connection with FIG. 1, FIG. 2, and FIG. 5.

In at least one embodiment, auditor 302 refers to an auditor, a computing entity under control of an auditor, or a computing entity with auditing capabilities. Auditor 302 may submit an audit request to shadow data lake 310. Auditor may refer to a user or role with sufficient permission to access shadow data lake 310. For example, auditor 302 may assume a role comprising one or more permissions that indicate a grant of access to deleted records table 312. Audit request 304 may be a web service API command, command line interface (CLI) command, or any suitable request for access. Audit request 304 may include a SQL statement indicating what data is being requested from shadow data lake 310.

Audit request 304 may be a request, command, or instruction that auditor 302 sends to shadow data lake 310 in any suitable manner. Audit request 304 may be a command submitted via a command line interface (CLI), graphical user interface (GUI) through a website, etc. Audit request 304 may be performed as part of an audit, investigation, or for other various permitted purposes. For example, auditor 302 may perform an audit as part of an investigation into why certain data was deleted—for example, to determine whether the destruction of records was for an illicit purpose. In some cases, auditor 302 performs periodic audits to ensure the integrity and completeness of data in the customer-facing data lake.

Customer data lake 306 may be in accordance with those described elsewhere, such as those discussed in connection with FIG. 1. Customer data lake 306 may comprise source table 308 that can store both privacy data and non-privacy data. For example, prior to a deletion request, source table 308 may have stored both privacy data 308A and non-privacy data 308B. A deletion request may have caused privacy data 308A to be deleted from customer data lake 306 and for privacy data 308A to be published to shadow data lake 310 according to a retention policy.

A shadow data lake service provider may receive audit request 304 and perform authentication and authorization processes to determine that the request is legitimate and that auditor 302 has sufficient permissions for the request to be fulfilled. Any suitable techniques for computer-based authorization and/or authentication may be utilized. After auditor 302 is authenticated and audit request 304 is authorized, shadow data lake 310 may fulfill audit request 304 by retrieving data records from deleted records table 312 according to the request, according to at least one embodiment. For example, auditor 302 can request a copy of all records deleted by a particular user as part of an investigation to determine whether any of the records were improperly deleted by the user. As another example, auditor 302 may request all deleted records over a certain time span, which may be performed as part of a regular/periodic audit to comply with internal or external auditing requirements, such as Sarbanes-Oxley (SOX) requirements.

A shadow data lake service provider may fulfill audit request 304 by scanning deleted records table 312 for records that match a filter specified by the audit request. The audit request may include a SQL statement. Audit response 314 may be generated by shadow data lake service provider and transmitted to auditor 302 in response to audit request 304. The audit response may include privacy data 308A or other data that was deleted from customer data lake 306 and is otherwise inaccessible based on queries to customer data lake 306.

Figure 4:
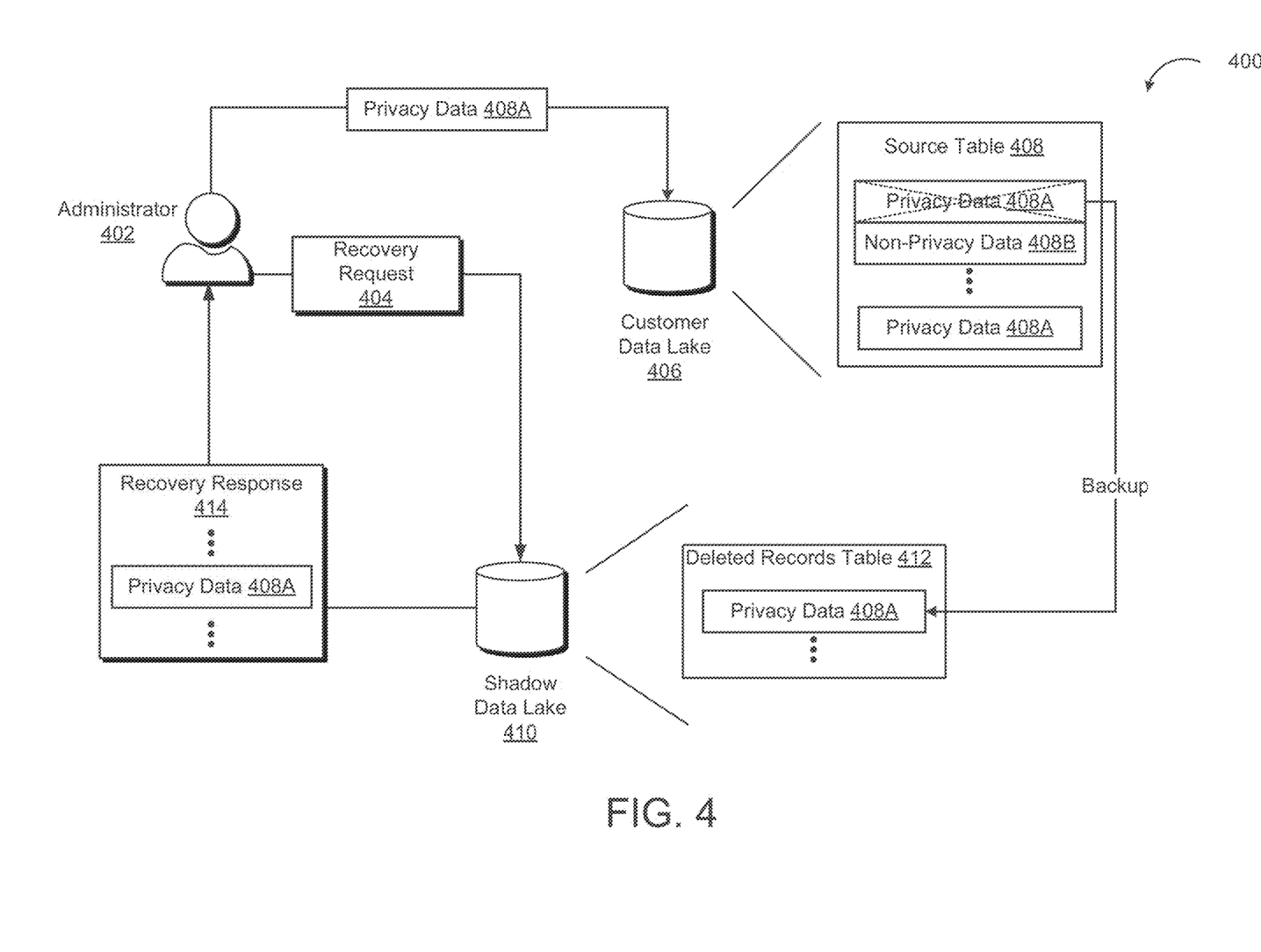
FIG. 4 illustrates an example of a computing environment of a backup and/or recovery workflow, in accordance with one or more example embodiments of the present disclosure.

FIG. 4 illustrates an example of a computing environment 400 of a backup and/or recovery workflow, in accordance with one or more example embodiments of the present disclosure. As illustrated in FIG. 4, an administrator 402 may submit a recovery request 404. Customer data lake 406 may refer to a customer-facing data lake comprising source table 408. Privacy data 408A may have been deleted from source table 408, for example, as described above in connection with FIG. 1. Privacy data 408A may have been previously published to shadow data lake 410 as part of a backup workflow. Shadow data lake 410 may comprise a deleted records table 412 where privacy data 408A is retained, even after deletion of the privacy data 408A from customer data lake 406. Recovery response 414 may be a response to recovery request 404. Administrator 402 may review recovery response 414 and determine a recovery strategy for how to recover privacy data 408A and store it in customer data lake 406. Components discussed in connection with FIG. 4 may be in accordance with corresponding components described elsewhere in this disclosure, such as those discussed in connection with FIG. 1, FIG. 2, and FIG. 5.

In at least one embodiment, administrator 402 refers to an administrator, a computing entity under control of an administrator, or a computing entity with recovery capabilities. In various embodiments, large-scale changes are applied to customer data lake 406 and these changes may involve deletions or updates to data lake data sets. These large-scale changes may be applied programmatically, for example, by running a script or routine across the data lake data set. In some embodiments, data that is changed or deleted by a large-scale change is published to shadow data lake, which can be used for various purposes. For example, the shadow data lake can be used to review whether the large-scale changes were applied correctly. As another example, the shadow data lake can be used to recover data that was erroneously deleted.

Administrator 402 may submit a recovery request to shadow data lake 410. Administrator may refer to a user or role with sufficient permission to access shadow data lake 410. For example, administrator 402 may assume a role comprising one or more permissions that indicate a grant of access to deleted records table 412. Recovery request 404 may be a web service API command, command line interface (CLI) command, or any suitable request for access. Recovery request 404 may include a SQL statement indicating what data is being requested from shadow data lake 410.

Recovery request 404 may be a request, command, or instruction that administrator 402 sends to shadow data lake 410 in any suitable manner. Recovery request 404 may be a command submitted via a command line interface (CLI), graphical user interface (GUI) through a website, etc. Recovery request 404 may be performed as part of a recovery process. For example, administrator 402 may perform a recovery of data that was improperly deleted—for example, in cases where the destruction of records was for an illicit purpose. While a recovery request is illustrated in FIG. 4, other types of requests are contemplated in the scope of this disclosure. For example, administrator 402 can submit a review request to inspect whether a bulk change was applied correctly to data lake 406 without necessarily performing any recovery operations.

Customer data lake 406 may be in accordance with those described elsewhere, such as those discussed in connection with FIG. 1. Customer data lake 406 may comprise source table 408 that can store both privacy data and non-privacy data. For example, prior to a bulk update, source table 408 may have stored both privacy data 408A and non-privacy data 408B. Privacy data 408A may be deleted from customer data lake 406 as part of applying the bulk update. In various embodiments, a bulk update workflow identifies a data record such as privacy data 408A to apply the bulk update to. For example, the bulk update may be a routine that obfuscates or otherwise pseudononymizes privacy data. Once a record is identified, it may be published to shadow data lake 410 prior to applying the bulk update logic.

A shadow data lake service provider may receive recovery request 404 and perform authentication and authorization processes to determine that the request is legitimate and that administrator 402 has sufficient permissions for the request to be fulfilled. Any suitable techniques for computer-based authorization and/or authentication may be utilized. After administrator 402 is authenticated and recovery request 404 is authorized, shadow data lake 410 may fulfill recovery request 404 by retrieving data records from deleted records table 412 according to the request, according to at least one embodiment. For example, administrator 402 can request a copy of all records deleted or otherwise modified as part of a bulk update.

A shadow data lake service provider may fulfill recovery request 404 by scanning deleted records table 412 for records that match a filter specified by the recovery request. The recovery request may include a SQL statement. Recovery response 414 may be generated by shadow data lake service provider and transmitted to administrator 402 in response to recovery request 404. The response may include privacy data 408A or other data that was deleted from customer data lake 406 and is otherwise inaccessible based on queries to customer data lake 406.

Administrator 402 may review the records included in recovery response. In various embodiment, administrator 402 may simply review the records that were deleted to determine whether the bulk update was applied correctly—for example, administrator 402 may verify that all records deleted as part of a bulk update include privacy data.

In some embodiments, administrator 402 performs a recovery process by reviewing recovery response 414 and determine a manner in which to perform a recovery. In some cases, privacy data 408A cannot be simply copied back into customer data lake 406 and additional operations are applied to ensure the integrity of the data sets. For example, if a record of an order was erroneously deleted and then the customer ID for the customer that placed the order was also deleted, then restoring the order record may require additional recovery steps, such as re-creating or recovering the customer record.

Figure 5:
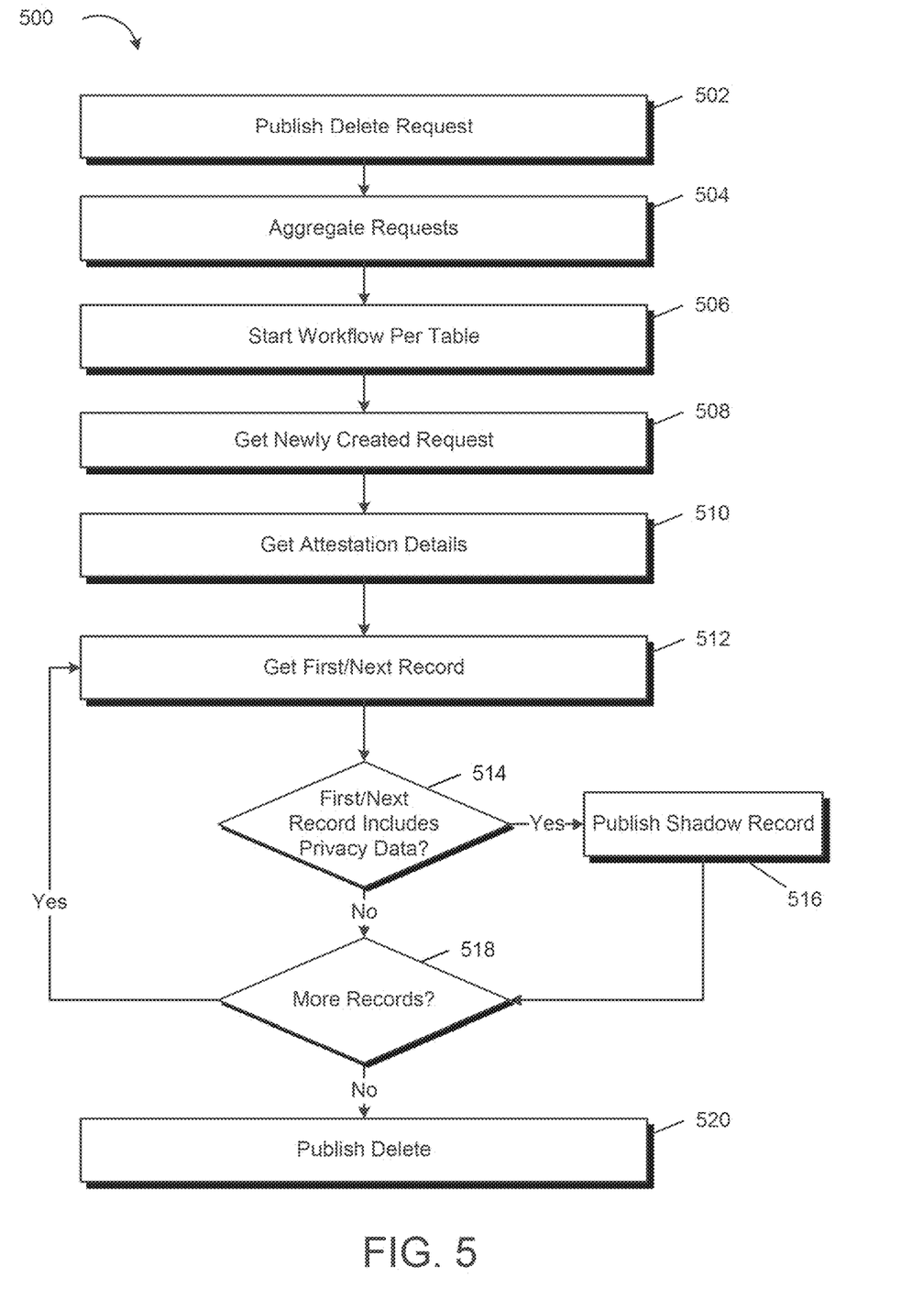
FIG. 5 shows an illustrative example of a process for implementing shadow data lakes, in accordance with one or more example embodiments of the present disclosure.

FIG. 5 shows an illustrative example of a process 500 for implementing shadow data lakes, in accordance with one or more example embodiments of the present disclosure. In at least one embodiment, some or all of the process 500 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 500 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 500 may be implemented in the context of various systems and methods described elsewhere in this disclosure, such as those discussed in connection with FIGS. 1-4 and 6. For example, process 500 can be performed by various components described in connection with FIGS. 1-4 and 6 utilizing one or more computing devices hosted and/or under the control of a computing resource service provider.

In at least one embodiment, a system performing process 500 is configured to publish 502 a delete request. The delete request may be submitted as a web service API command. The request may be published by a service to a notification service. The notification service may provide message deliver capabilities using a publisher and subscriber (pub/sub) model. Publishers may communicate asynchronously with subscribers by sending messages to a topic, and clients can subscribe to a topic and receive published messages using a message queuing service. Message queuing service may be in accordance with those described in connection with FIG. 2 and may obtain published messages by subscribing to a topic and then receiving from a publisher (e.g., notification service) a notification or message with information related to the delete request or the delete request itself. This data can be aggregated in a cache service with other delete requests and processed in groups.

In at least one embodiment, a system performing process 500 aggregates 504 delete requests. Delete requests may be aggregated in the delete request cache service so that multiple delete requests are batched and processed together, rather than individually. Delete requests may be aggregated to reduce the number of discrete write events in the data vaults where the raw data of the data lake are stored.

A delete workflow handler may be used to start 506 a deletion workflow, which may be performed on a per table basis. The deletion workflow may be initiated based on a threshold number of requests being aggregated together, or a predefined time period elapsing. As part of the deletion workflow, a system may get 508 a newly created request from delete request cache service. The request may include a SQL statement which can be used to query a table for a set of records to delete. The system may get 510 attestation details from an attestation service. Data producers may provide attestation details to an attestation service. Attestation details may include logic that is used to determine whether a particular record includes privacy data or other information about the record. For example, the attestation details may indicate where in the record to inspect for privacy data. Different attestation details may exist. For example, a first attestation detail may be used to determine whether a record includes privacy data, a second attestation detail may be used to determine whether a record includes financial information, and so on.

In various embodiments, the system is configured to get 512 a first record. The record may be from a set of records that are relevant to the deletion request—for example, the system may query a customer data lake for all records that include a customer ID. The system may then determine whether 514 the first record includes privacy data or is subject to any other compliance requirements. The determination may be made using one or more attestation details. If the record is subject to a compliance requirement, then the system may publish 516 the first record or a portion thereof (e.g., one or more fields of a record) to a shadow data lake. Additional metadata may also be recorded, such as information regarding how or why the deletion was performed, such as whether it was as part of a particular bulk update and/or the user that initiated the deletion request. The first record may be marked for deletion.

The system may be configured to determine whether 518 there are more records to scan. If there are more records to scan, then steps 512-518 may be repeated with the next record. Once all records have been reviewed, then the system may publish 520 the delete operation, which will cause the record to be deleted. Other copies of the data—for example, transformed versions of the record which may be stored in databases or caches may also be deleted as part of this operation. A delete operation is an example of a type of operation that can be applied to a record. In some embodiments, a change is applied to at least a portion of the record.

In this context, the change may, for example, be the deletion of the entire record, the deletion of values stored in one or more fields, columns, or attributes of the record, the updating of one or more values stored in one or more fields, columns, or attributes of the record, the writing of new values in one or more fields, columns, or attributes of the record that were previously empty, and various other types of changes that can be applied to structured data.

The examples presented herein are not meant to be limiting.

Figure 6:
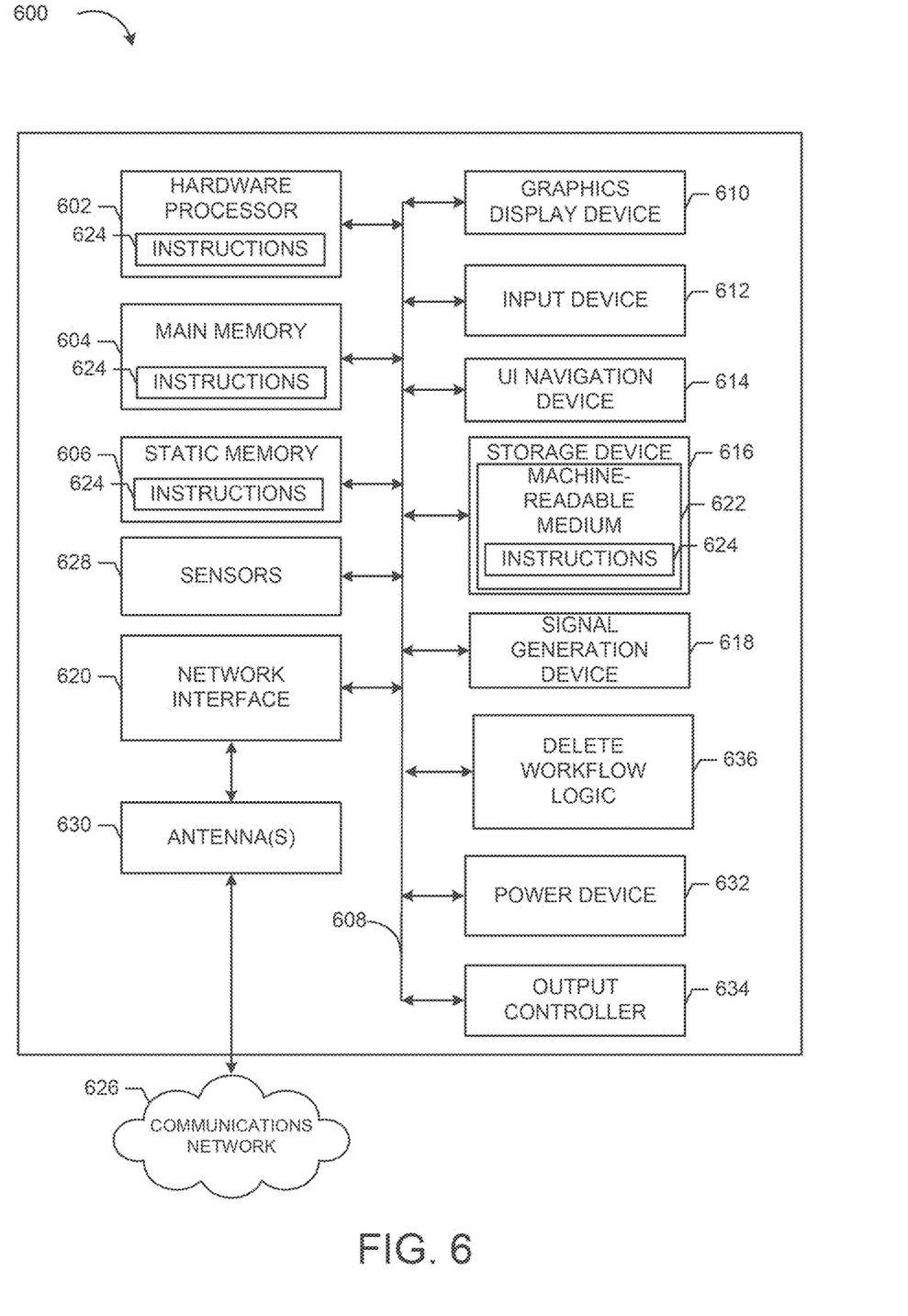
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., implemented in whole or in part in the context of embodiments described in connection with other figures. In some embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P) (or other distributed) network environments. The machine 600 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include any combination of the illustrated components. For example, the machine 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (e.g., drive unit) 616, a signal generation device 618, and a network interface device/transceiver 620 coupled to antenna(s) 630. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Machine 600 comprises delete workflow logic 636, in at least one embodiment. Delete workflow logic 636 may refer to hardware, software, or a combination thereof that can be utilized to perform various techniques described throughout this disclosure, such as those discussed in connection with FIG. 1. In at least one embodiment, delete workflow logic 636 refers to software application or module (e.g., a dynamically linked library or other suitable component of a computer-executable program) running on the machine 600 that performs various functionality, such as processes described in connection with FIG. 5. In some embodiments, delete workflow logic 636 refers to a software component running on machine 600 that is stored in main memory 604 as computer-executable instructions that, as a result of execution by one or more processors (e.g., hardware processor 602), causes the one or more processors to perform one or more computer-based operations described in connection with FIG. 5 or other processes described throughout this disclosure.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Additionally, the phrase "based on" may be synonymous to "based at least in part on" rather than "based solely on" unless it is explicitly stated or clear from the context that the latter meaning is intended. Additionally, the various terms used throughout this disclosure may relate to various fields of mathematics, science, and/or engineering. These terms are to be interpreted according to their respective fields unless otherwise clear from the context in which they are being described. As a non-limiting example, the terms "proper subset" and "subset" are to be interpreted according to their definitions given in mathematical set theory, unless clearly indicated by the context.

What is claimed is:

1. A computer-implemented method, comprising:
   sending a deletion request to a notification service;
   publishing a message associated with the deletion request to one or more subscribers, the one or more subscribers including a queuing service;
   receiving, at the queueing service, the message associated with the deletion request;
   storing the deletion request in a cache service; and
   initiating a deletion workflow, wherein the deletion workflow comprises:
   obtaining the deletion request from the cache service;
   requesting, from an attestation service, one or more attestation details, wherein the attestation details identify a first field of a record and excludes a second field of the record;
   receiving, from the attestation service, the attestation details;
   scanning one or more partitions of a data lake based on the deletion request to obtain one or more records of the data lake, the one or more records including the record;
   wherein as each of the one or more records are obtained as part of the scanning:
   determining, based on the one or more attestation details, that the currently obtained record is subject to a retention policy;
   publishing a copy of the currently obtained record to a shadow data lake as a result of determining that the record is subject to the retention policy, wherein the copy of the record is inaccessible to a first user that submitted the deletion request; and
   deleting the one or more records from the data lake.

2. The computer-implemented method of claim 1, further comprising:
   receiving a request by a second user to access the shadow data lake;
   determining that the second user has sufficient permissions to access the shadow data lake; and
   providing the copy of the record to the second user in response to the request.

3. The computer-implemented method of claim 1, wherein the one or more records comprise privacy data associated with a user associated with the deletion request.

4. The computer-implemented method of claim 3, wherein the privacy data is subject to a data privacy standard or regulation.

5. A system, comprising:
   one or more processors; and
   memory storing executable instructions that, as a result of execution by the one or more processors, cause the system to:
   receive a first request by a first user;
   request, from an attestation service, attestation information associated with a retention policy, wherein the attestation information identifies a first field of a record and excludes a second field of the record;
   receive, from the attestation service, the attestation information;
   identify one or more records by at least scanning one or more partitions of a data lake based on the first request and the attestation information;
   wherein as each of the one or more records are obtained as part of the scanning:
   determine that the first field of the currently obtained record of the one or more records is subject to the retention policy;
   publish at least part of the currently obtained record to a shadow data lake based on the determination that the record is subject to the retention policy, wherein the at least part of the record, includes the first field and is inaccessible to the first user; and
   apply a change to at least a portion of the record of the one or more records from the data lake.

6. The system of claim 5, wherein the instructions comprise further instructions that, as a result of execution by the one or more processors, cause the system to further;
   receive a second request by a second user;
   determine the second user is authorized to access the shadow data lake; and
   provide the second user with access to the at least part of the record.

7. The system of claim 5, wherein the change to at least the portion of the record is an update to one or more fields of the record.

8. The system of claim 5, where the one or more records are associated with an identifier specified by the first request.

9. The system of claim 5, wherein the instructions to determine that the record of the one or more records is subject to the retention policy comprises instructions to determine that the one or more records comprise privacy data.

10. The system of claim 5, wherein the instructions to identify the one or more records includes using the attestation information to scan one or more partitions of the data lake.

11. The system of claim 5, wherein the instructions to apply the change to at least a portion of the record from the data lake include instructions that, as a result of execution by the one or more processors, cause the system to submit a command to a service provider hosting the data lake to apply the change to the at least portion of the record.

12. A non-transitory computer-readable storage medium storing executable instructions that, as a result of being executed by one or more processors of a computer system, cause the computer system to at least:
   receive a first request by a first user;
   request, from an attestation service, attestation details associated with one or more retention policies, wherein the attestation details identify a first field of a record and excludes a second field of the record;
   receive, from the attestation service, the attestation information;
   search one or more tables of a data lake based on the first request and the attestation details to obtain one or more records of the of the data lake;

wherein as each of the one or more records are obtained as part of the search:
  determine, based on a result of the search, a currently obtained record is subject to the one or more retention policies;
  publish at least a portion of the currently obtained record to a shadow data lake, the at least the portion including the first field, wherein the shadow data lake is inaccessible to the first user; and
apply one or more changes to the one or more records from the data lake.

13. The non-transitory computer-readable storage medium of claim 12, wherein the instructions, as a result of being executed by the one or more processors of the computer system, further cause the system to:
  receive a second request by a second user;
  determine the second user is authorized to access the shadow data lake; and
  provide the second user with access to a record of the shadow data lake.

14. The non-transitory computer-readable storage medium of claim 12, wherein the retention policy identifies records of the data lake that include financial data.

15. The non-transitory computer-readable storage medium of claim 12, wherein the instructions to publish the at least portion of the currently obtained record to the shadow data lake include instructions that, as a result of being executed by the one or more processors of the computer system, cause the system to publish metadata associated with the first request to the shadow data lake.

16. The non-transitory computer-readable storage medium of claim 15, wherein the metadata indicates the first user requested deletion of the one or more records.

17. The non-transitory computer-readable storage medium of claim 12, wherein the one or more retention policies indicate all records of the data lake are subject to the one or more retention policies.

18. The non-transitory computer-readable storage medium of claim 12, wherein the first request is a request to delete privacy data subject to a compliance requirement.

19. The non-transitory computer-readable storage medium of claim 18, wherein the compliance requirement is a data privacy standard or regulation.

* * * * *